United States Patent
Ko (10) Patent No.: US 11,767,052 B2
(45) Date of Patent: Sep. 26, 2023

(54) STEERING DEVICE OF VEHICLE

(71) Applicant: HL MANDO CORPORATION, Gyeonggi-do (KR)

(72) Inventor: Kyung Min Ko, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 69 days.

(21) Appl. No.: 17/387,902

(22) Filed: Jul. 28, 2021

(65) Prior Publication Data

US 2022/0032992 A1 Feb. 3, 2022

(30) Foreign Application Priority Data

Jul. 29, 2020 (KR) .................. 10-2020-0094219

(51) Int. Cl.
*B62D 3/12* (2006.01)

(52) U.S. Cl.
CPC .................. *B62D 3/126* (2013.01)

(58) Field of Classification Search
CPC . B62D 1/20; B62D 3/08; B62D 3/126; B62D 5/0421; B62D 6/10; B62D 3/12; B60Y 2306/09; B60Y 2410/102

USPC ............................. 280/775, 93.502
See application file for complete search history.

(56) References Cited

U.S. PATENT DOCUMENTS 8,740,712 B2 * 6/2014 Kim .................. F16D 1/116
464/182

FOREIGN PATENT DOCUMENTS

| JP | 2020024005 A | * | 2/2020 |
| KR | 20130034711 A | * | 4/2013 |
| KR | 20140022613 A | * | 2/2014 |
| KR | 20200026506 A | * | 3/2020 |

OTHER PUBLICATIONS

English Translation and original document for JP 2020024005 A, Igarashi (Year: 2020).*

* cited by examiner

*Primary Examiner* — Paul N Dickson
*Assistant Examiner* — Caitlin Anne Miller
(74) *Attorney, Agent, or Firm* — Ladas & Parry, LLP (57) ABSTRACT

According to embodiments, it is possible to prevent vibration and gaps in a coupling structure between rotation shafts, thus allowing for reduction in noise, enhanced responsiveness, accurate steering, and a better straight driving performance.

12 Claims, 10 Drawing Sheets

STEERING DEVICE OF VEHICLE

CROSS-REFERENCE TO RELATED APPLICATION

This application claims priority from Korean Patent Application No. 10-2020-0094219, filed on Jul. 29, 2020, which is hereby incorporated by reference for all purposes as if fully set forth herein.

BACKGROUND

Field

Embodiments relate to a steering device of a vehicle and, more specifically, to a steering device of a vehicle, which may prevent vibrations and gaps in a coupled structure between rotation shafts, thus allowing for a reduction in noise, enhanced responsiveness, accurate steering, and a better straight driving performance.

Description of Related Art

A steering device of a vehicle changes the traveling direction of the vehicle at the driver's will to assists the driver to drive the vehicle in the desired direction by arbitrarily changing the center of rotation around the front wheel.

A power assist steering device assists in the driver's steering wheel manipulation using a booster, thereby allowing the driver to easily change the traveling direction of the vehicle with less power.

The steering shaft is connected with the steering wheel and is rotated by the driver's manipulation of the steering wheel. A motor or a hydraulic device applies torque to the steering shaft to assist the driver in steering wheel manipulation.

Such a steering shaft is configured of a combination of multiple shafts, rather than a single shaft. Typically, two shafts which are coaxially provided are circumferentially fastened to each other via serrations formed in their coupled portions.

Conventional steering devices lack a structure to prevent gaps between the respective serrations of the two shafts. Thus, a possible gap may cause noise, resulting in an unpleasant steering experience and deterioration of straight-driving performance.

BRIEF SUMMARY

According to an embodiment, there is provided a steering device of a vehicle, which may prevent vibrations and gaps in a coupled structure between rotation shafts, thus allowing for a reduction in noise, enhanced responsiveness, accurate steering, and a better straight driving performance.

According to an embodiment, there is provided a steering device of a vehicle, comprising a first shaft having a first coupling part at an end thereof, a first serration formed on an outer circumferential surface of the first coupling part, a second shaft having a second coupling part at an end thereof, the second coupling part having a coupling hole to which the first coupling part is inserted, a second serration formed on an inner circumferential surface of the second coupling part, the second serration engaged with the first serration, and a bolt axially coupled to the first shaft and the second shaft.

According to embodiments, it is possible to prevent vibration and gaps in a coupling structure between rotation shafts, thus allowing for reduction in noise, enhanced responsiveness, accurate steering, and a better straight driving performance.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
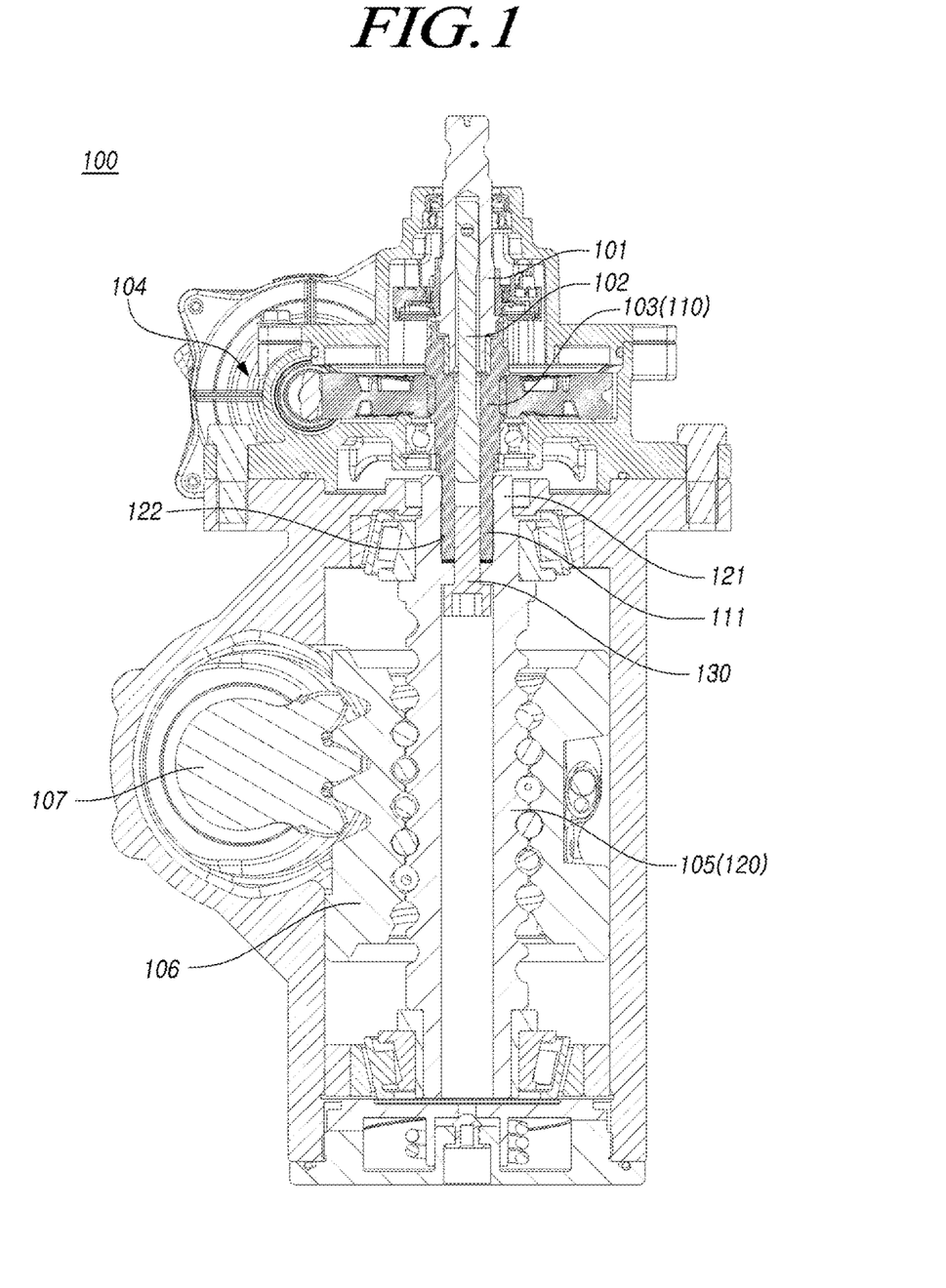
FIG. 1 is a cross-sectional view illustrating a steering device of a vehicle according to an embodiment.
Figure 2:
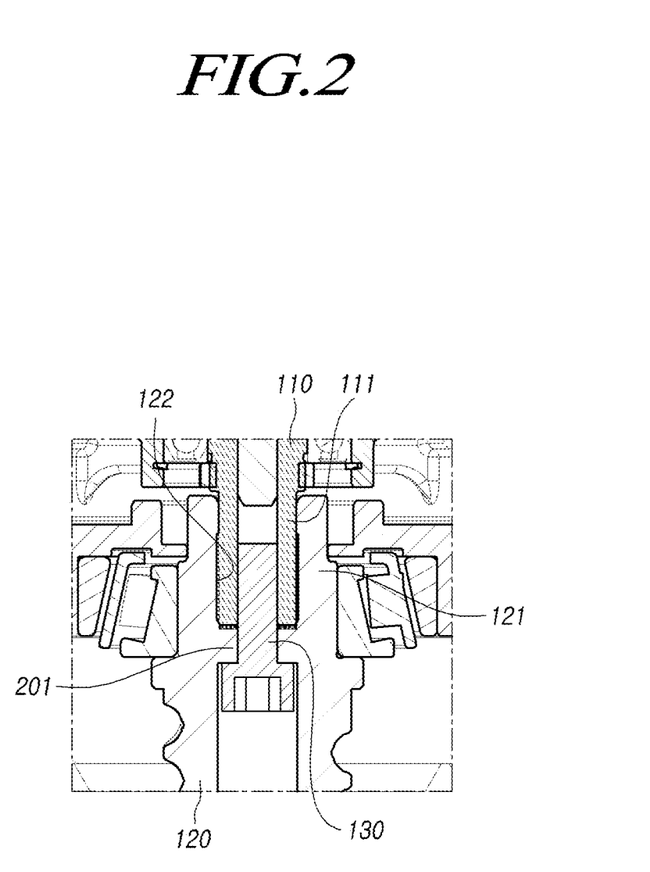
FIG. 2 is an enlarged view of a portion of FIG. 1.
Figure 3:
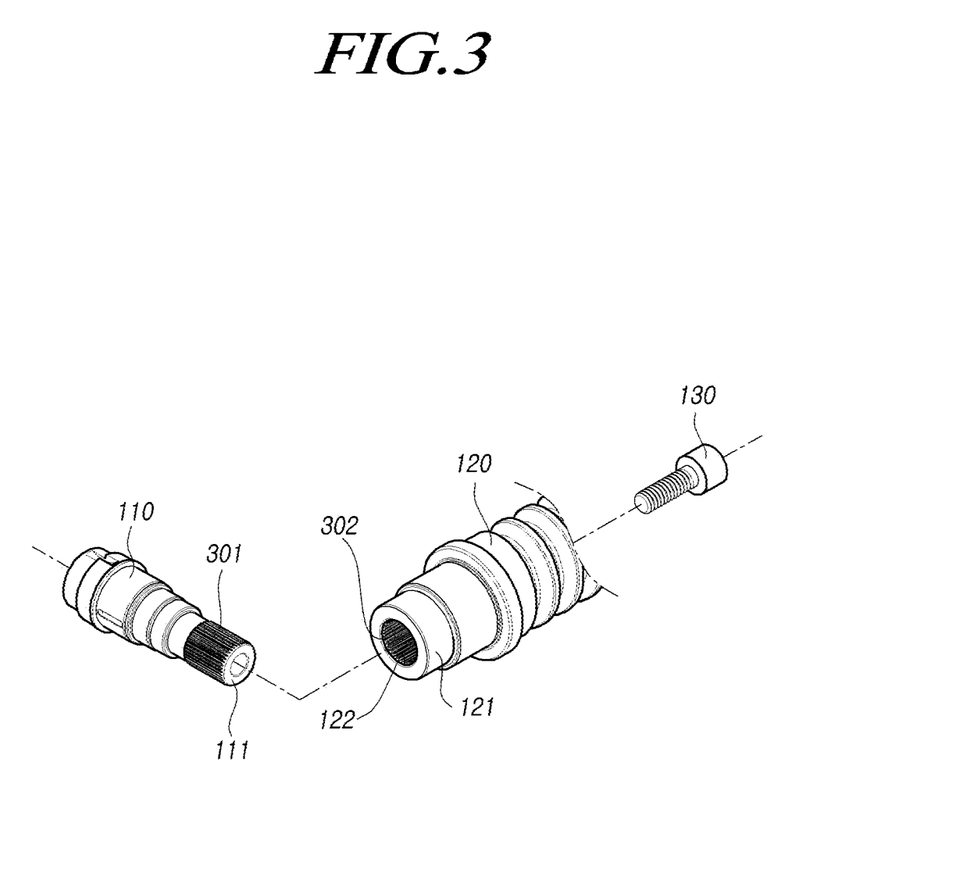
FIG. 3 is an exploded perspective view illustrating a portion of FIG. 1.
Figure 4:
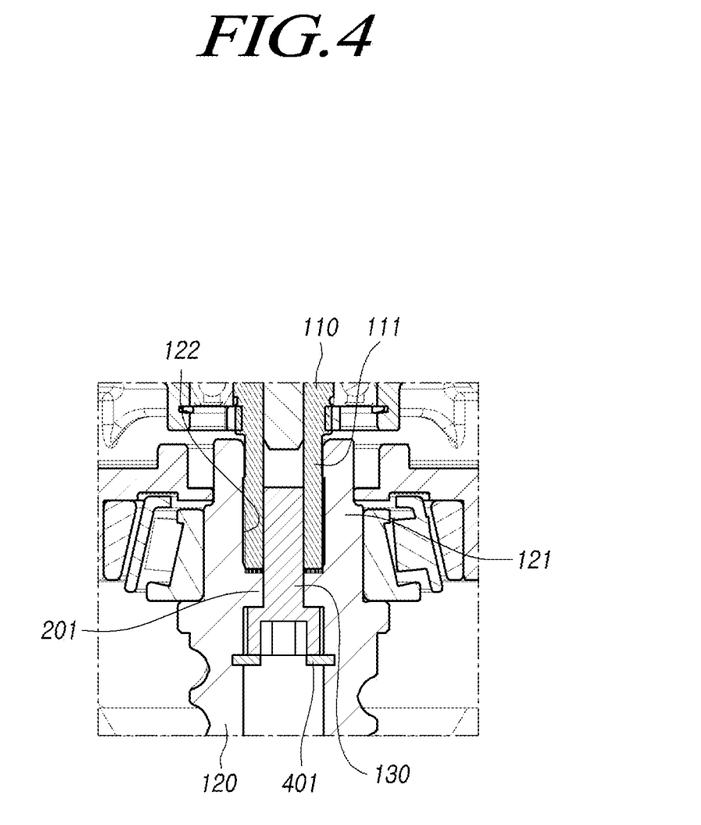
FIG. 4 is a cross-sectional view illustrating a portion of a steering device of a vehicle according to an embodiment.
Figure 5:
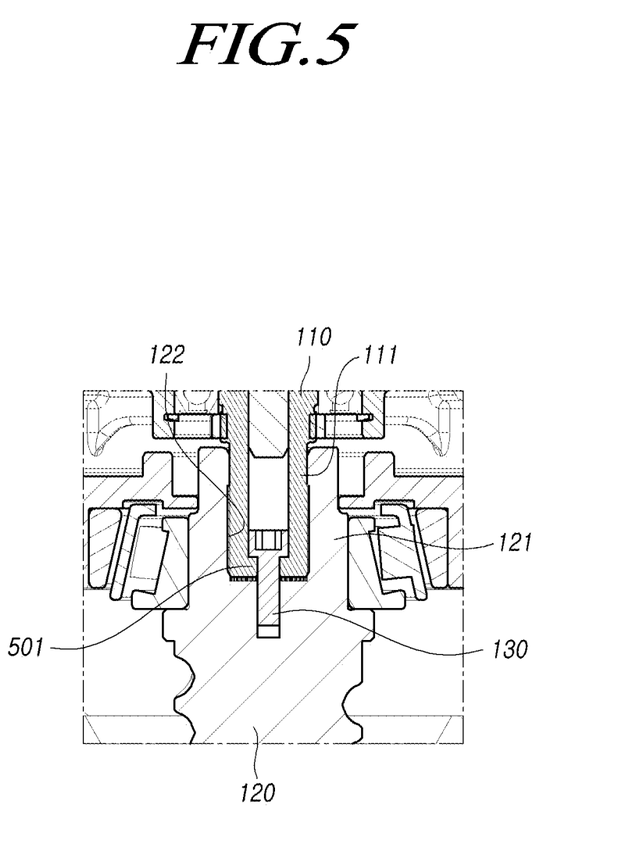
FIG. 5 is a cross-sectional view illustrating a portion of a steering device of a vehicle according to an embodiment.
Figure 6:
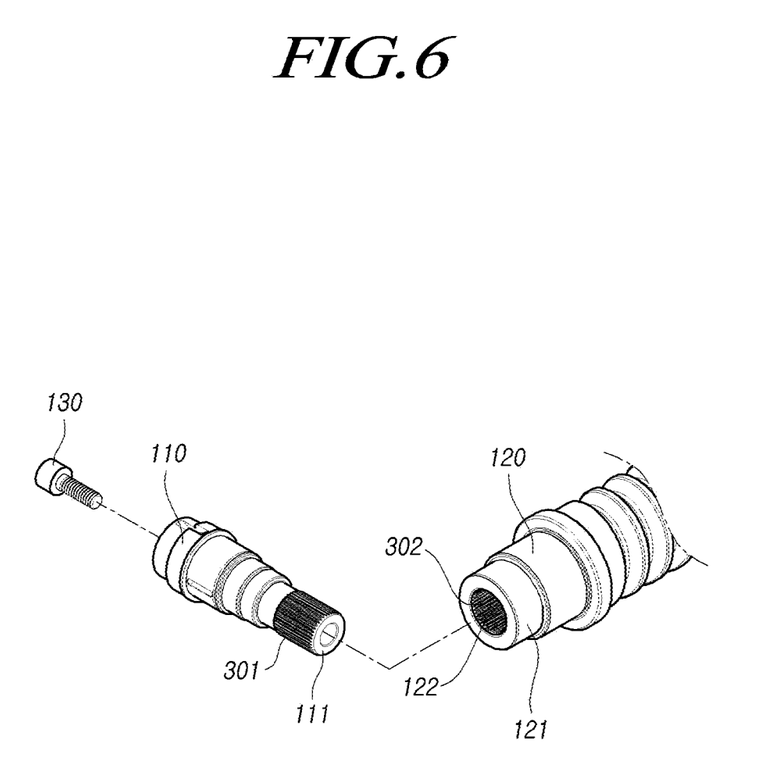
FIG. 6 is an exploded perspective view illustrating a portion of FIG. 5.
Figure 7:
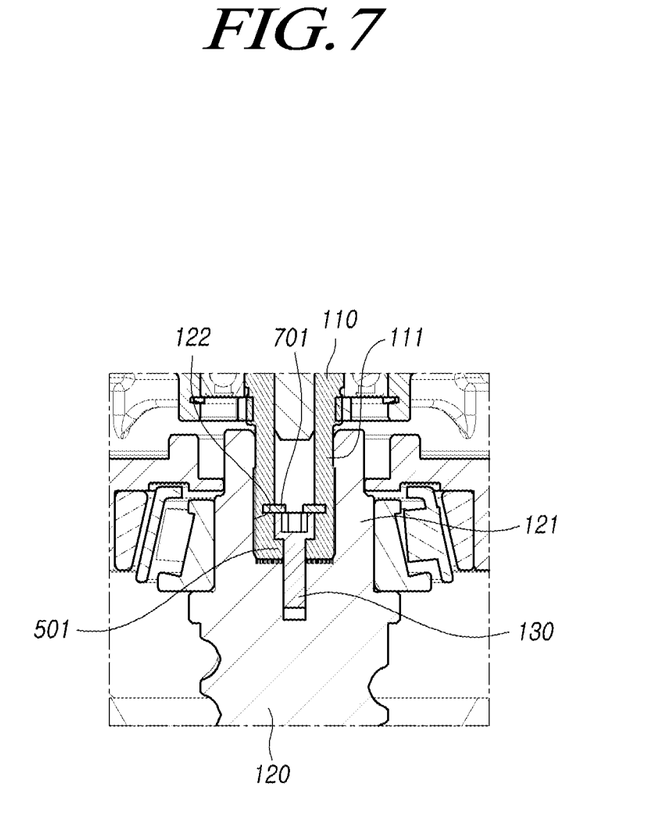
FIG. 7 is a cross-sectional view illustrating a portion of a steering device of a vehicle according to an embodiment.
Figure 8:
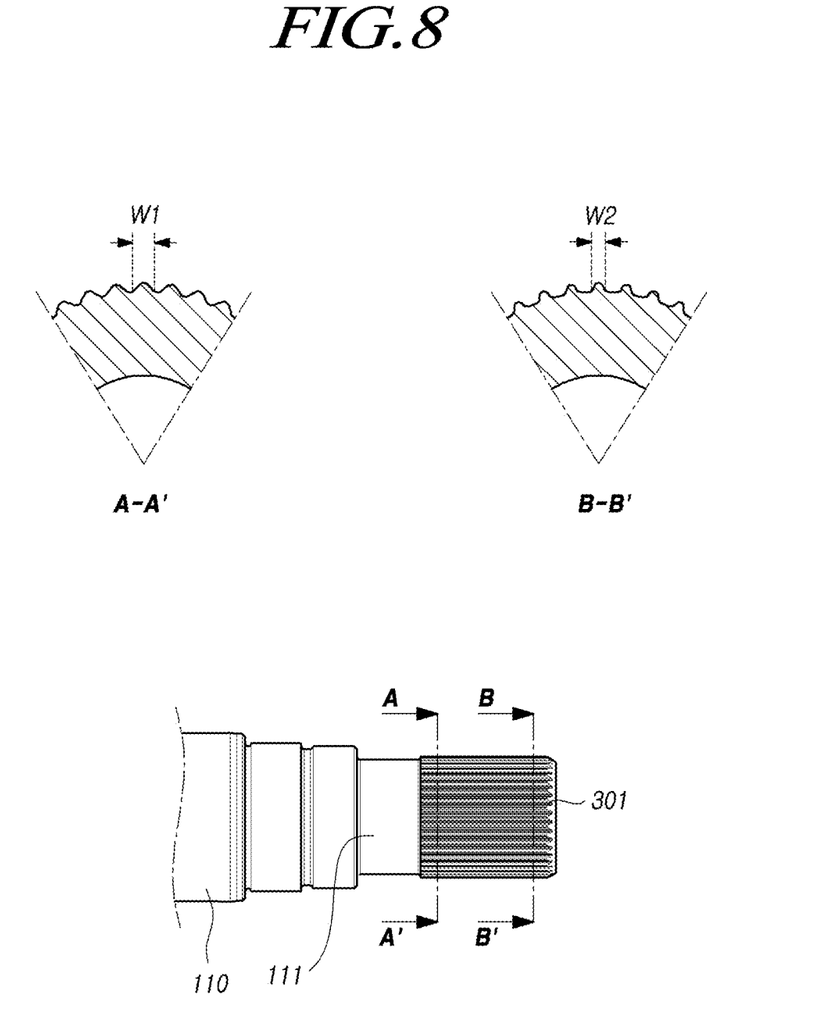
FIGS. 8 and 9 are a side view and a cross-sectional view illustrating a portion of a steering device of a vehicle according to an embodiment.
Figure 9:
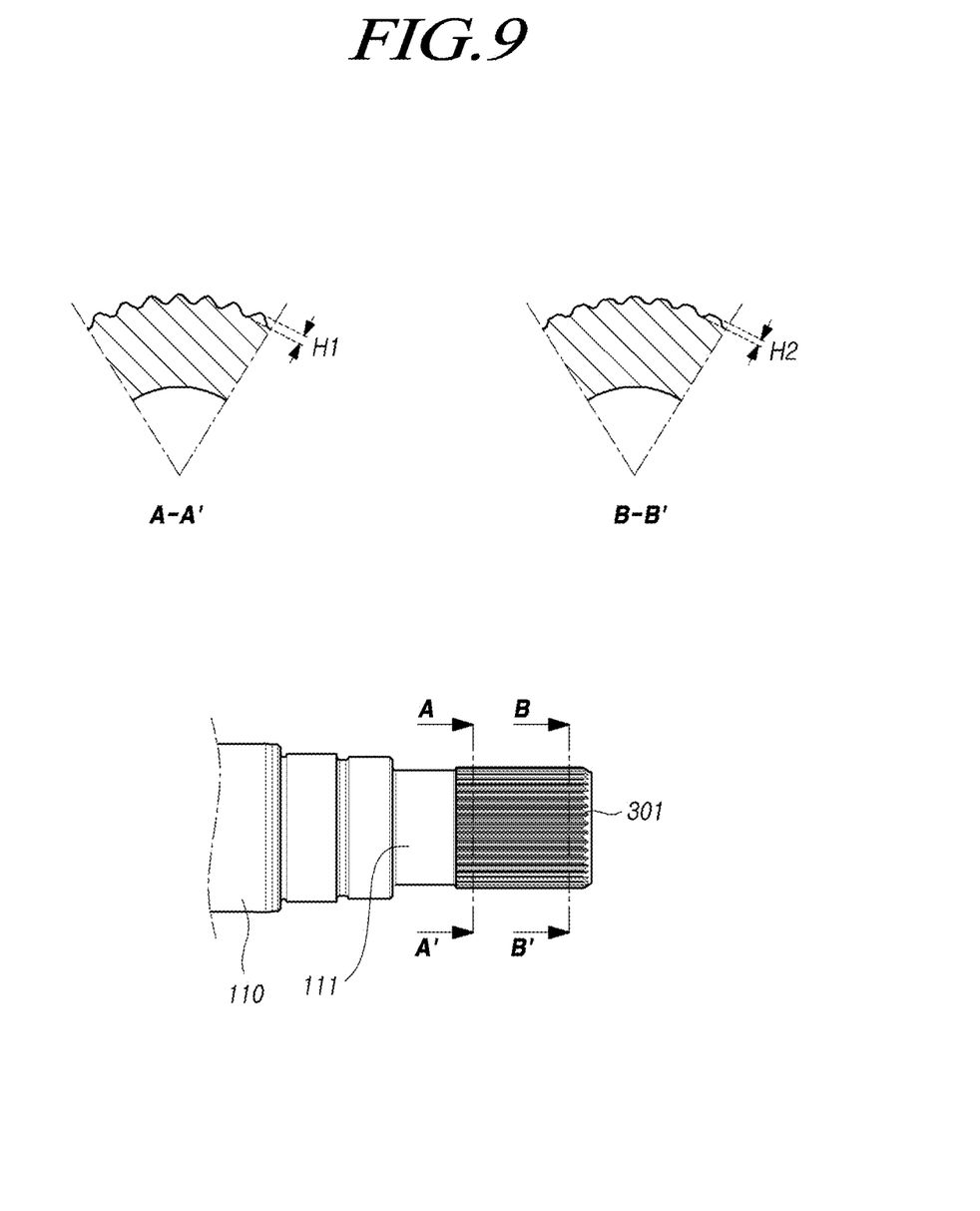
Figure 10:
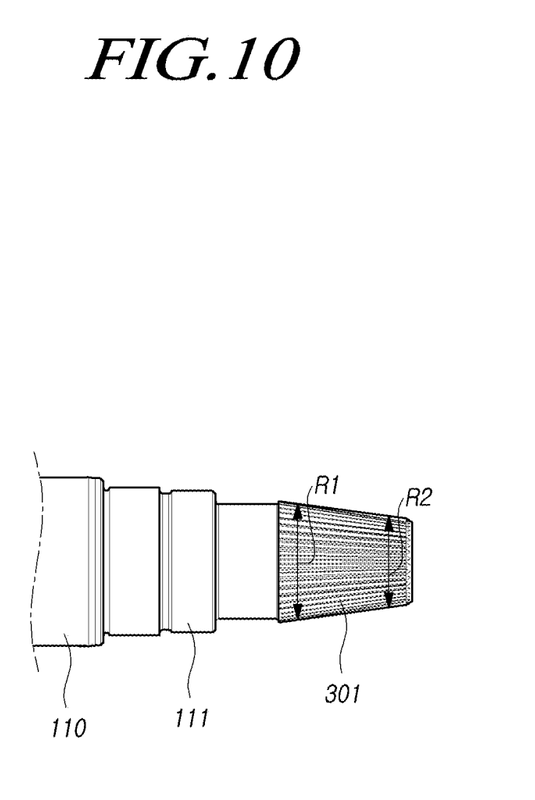
FIG. 10 is a side view illustrating a portion of a steering device of a vehicle according to an embodiment.

FIG. 1 is a cross-sectional view illustrating a steering device of a vehicle according to an embodiment. FIG. 2 is an enlarged view of a portion of FIG. 1. FIG. 3 is an exploded perspective view illustrating a portion of FIG. 1. FIG. 4 is a cross-sectional view illustrating a portion of a steering device of a vehicle according to an embodiment. FIG. 5 is a cross-sectional view illustrating a portion of a steering device of a vehicle according to an embodiment. FIG. 6 is an exploded perspective view illustrating a portion of FIG. 5. FIG. 7 is a cross-sectional view illustrating a portion of a steering device of a vehicle according to an embodiment. FIGS. 8 and 9 are a side view and a cross-sectional view illustrating a portion of a steering device of a vehicle according to an embodiment. FIG. 10 is a side view illustrating a portion of a steering device of a vehicle according to an embodiment.

According to an embodiment, a steering device 100 of a vehicle includes a first shaft 110 having a first coupling part 111 at an end thereof, a second shaft 120 having a second coupling part 121 at an end thereof, and a bolt 130 axially coupled to the first shaft 110 and the second shaft 120. A first serration 301 is formed on an outer circumferential surface of the first coupling part 111. The second coupling part 121 has a coupling hole 122 to which the first coupling part 111 is inserted. A second serration 302 is formed on an inner circumferential surface of the second coupling part 121. The first serration 301 is engaged with the second serration 302.

The first shaft 110 and the second shaft 120 may be any shafts that may be coupled together by serrations in the steering device. For example, the first shaft 110 and the second shaft 120 may be a pinion shaft and a rotation shaft, which is coupled with the pinion shaft via serrations, in a rack-pinion coupling structure or may be a yoke and a rotation shaft, which is coupled with the yoke via serrations, in a universal joint.

FIG. 1 illustrates a steering device equipped in a commercial vehicle. An output shaft 103 to which a worm wheel of a worm decelerator 104 is coupled may correspond to the first shaft 110, and a ball screw 105 engaged with a sector shaft 107 may correspond to the second shaft 120. However, it should be noted that the embodiment illustrated in FIG. 1 is merely an example and the first shaft 110 and the second shaft 120 are not limited to the output shaft 103 and the ball screw 105 of the steering device equipped in the commercial vehicle.

An input shaft 101 is connected with a steering wheel (not shown) and rotated by the driver's manipulation of the steering wheel, and the output shaft 103 is coupled to the input shaft 101 via a torsion bar 102.

The worm wheel of the worm decelerator 104 is coupled to the output shaft, and the worm shaft engaged with the worm wheel is rotated by a motor to generate auxiliary torque to the output shaft 103.

However, the worm decelerator is not necessarily provided, and if the worm decelerator is not provided, the input shaft, the torsion bar, and the output shaft are not separately provided, but are provided as a single shaft that is connected with the steering wheel.

The output shaft 103, which is the first shaft 110, is coupled with the ball screw 105, which is the second shaft 120, and as the driver's steering torque and the motor's auxiliary torque are applied to the output shaft, the ball screw 105 is rotated. As the ball screw 105 rotates, a ball nut 106 is slid, a sector shaft 107 is rotated, and a pitman arm (not shown), together with the sector shaft 107, is rotated, steering the wheels.

The output shaft 103 and the ball screw 105 are coupled together by serrations and are fixed to each other in the circumferential direction. To prevent a gap where the output shaft 103 and the ball screw 105 are coupled together, a bolt 130 is coupled to the first shaft 110 and the second shaft 120 and, as is described below, the ridges of the first serration 301 or the first coupling part 111 is tapered.

Hereinafter, for convenience of description and understanding, the output shaft 103 and the ball screw 105 are referred to as the first shaft 110 and the second shaft 120, respectively.

A first coupling part 111 is provided at an end of the first shaft 110. A first serration 301 is formed on an outer circumferential surface of the first coupling part 111. A second coupling part 121, which has a coupling hole 122 axially recessed, is provided at an end of the second shaft 120. A second serration 302 is formed on an inner circumferential surface of the second coupling part 121. The first coupling part 111 is inserted into the coupling hole 122 and coupled to the second coupling part 121, so that the first serration 301 and the second serration 302 are engaged with each other.

As the first shaft 110 and the second shaft 120 are axially coupled and brought in tight contact with each other by the bolt 130, axial vibrations between the first shaft 110 and the second shaft 120 are absorbed, reducing noise.

As the ridges of the first serration 301 or the first coupling part 111 is tapered, the axial gap and circumferential gap between the first serration 301 and the second serration 302 may be compensated when the first shaft 110 and the second shaft 120 are brought in tight contact by the bolt 130, thus allowing for a reduction in noise, enhanced responsiveness to the driver's steering wheel manipulation, and accurate steering and better straight driving performance.

A coupling structure of the bolt 130 is described with reference to FIGS. 2 to 7, and the shape of the serration is described with reference to FIGS. 8 to 10.

Referring to FIGS. 2 and 3, the second shaft 120 may be hollow, and the bolt 130 may be inserted into the second shaft 120 and coupled to the first shaft 110.

In other words, the first coupling part 111 may be inserted into the coupling hole 122 and coupled to the second coupling part 121, and the bolt 130 may be coupled in a direction from the second shaft 120 to the first shaft 110, so that the first shaft 110 and the second shaft 120 may come in tight contact in the axial direction.

An end of the bolt 130 is inserted into the first coupling part 111 and is screwed to the first coupling part 111.

The second shaft 120 is hollow. Thus, if the second shaft 120 is a ball screw 105 as illustrated in FIG. 1, the ball screw 105 is hollow, which is advantageous in terms of weight and costs.

The inner circumferential surface of the second shaft 120 may reduce in diameter, forming a step portion 201. The head of the bolt 130 may be axially supported by the step portion 201. In other words, the step portion 201 is provided between the end of the first coupling portion 111 and the head of the bolt 130.

Referring to FIG. 4, to prevent the bolt 130 from loosening as the first shaft 110 and the second shaft 120 are rotated, a supporting member 401 supported on a side opposite to the step portion 201 by the head of the bolt 130 may be coupled to the inner circumferential surface of the second shaft 120.

In other words, as the head of the bolt 130 is fixed between the step portion 201 and the supporting member 401, axial movement of the bolt 130 may be restricted, and loosening of the bolt 130 may be prevented.

The supporting member 401 may be, e.g., a snap ring or a lock screw.

Referring to FIGS. 5 and 6, the first shaft 110 may be hollow, and the bolt 130 may be inserted into the first shaft 110 and coupled to the second shaft 120.

In other words, the first coupling part 111 may be inserted into the coupling hole 122 and coupled to the second coupling part 121, and the bolt 130 may be coupled in a direction from the first shaft 110 to the second shaft 120, so that the first shaft 110 and the second shaft 120 may come in tight contact in the axial direction.

An end of the bolt 130 is inserted into the second shaft 120 and screwed to the second shaft 120.

The first shaft 110 is hollow. Thus, if the first shaft 110 is an output shaft 103 as illustrated in FIG. 1, the hollow of the output shaft 103, where the torsion bar 102 is inserted, may extend up to the end.

The inner circumferential surface of the first shaft 110 may reduce in diameter, forming a step portion 501. The head of the bolt 130 may be axially supported by the step portion 501. In other words, the step portion 501 is provided between the end of the second coupling portion 121 and the head of the bolt 130.

Referring to FIG. 7, to prevent the bolt 130 from loosening as the first shaft 110 and the second shaft 120 are rotated, a supporting member 701 supported on a side opposite to the step portion 501 by the head of the bolt 130 may be coupled to the inner circumferential surface of the first shaft 110.

As described above, the first shaft 110 and the second shaft 120 are brought into tight contact with each other by the bolt 130. To compensate for the axial gap and circumferential gap between the first serration 301 and the second serration 302 as the first shaft 110 and the second shaft 120 come into tight contact with each other, the ridges of the first serration 301 or the first coupling part 111 may be tapered.

The second serration 302 is formed in a shape complementary to the first serration 301 to engage with the first serration 301, and the coupling hole 122 of the second coupling part 121 is formed in a shape complementary to the first coupling part 111 to allow the first coupling part 111 to be inserted therethrough. Thus, if the ridges of the first serration 301 are tapered, the valleys of the second serration 302 are tapered accordingly. If the first coupling part 111 is tapered, the coupling hole 122 of the second coupling part 121 is tapered accordingly. Thus, no detailed description and illustration of the second serration 302 and the coupling hole 122 are given below.

Referring to FIG. 8, the first serration 301 may be formed so that its ridges reduce in width from the first shaft 110 toward the second shaft 120 (W1>W2).

In other words, as two opposite sides, in the circumferential direction, of the ridge of the first serration 301 are tapered, the axial gap and the circumferential gap between the first serration 301 and the second serration 302 are compensated when the first shaft 110 and the second shaft 120 are brought in tight contact with each other by the bolt 130.

Referring to FIG. 9, the first serration 301 may be formed so that its ridges reduce in height from the first shaft 110 toward the second shaft 120 (H1>H2).

In other words, as the outer surface, in the radial direction, of the ridge of the first serration 301 is tapered, the axial gap and the circumferential gap between the first serration 301 and the second serration 302 are compensated when the first shaft 110 and the second shaft 120 are brought in tight contact with each other by the bolt 130.

Referring to FIG. 10, the first coupling part 111 may reduce in diameter from the first shaft 110 toward the second shaft 120 (R1>R2).

In other words, as the outer diameter of the first coupling part 111 is tapered, the axial gap and the circumferential gap between the first serration 301 and the second serration 302 may be compensated when the first shaft 110 and the second shaft 120 are brought in tight contact with each other by the bolt 130.

If the ridges of the first serration 301 are formed with a constant width and height, and the first coupling part 111 has a constant diameter, it would be difficult to compensate for gaps between the first serration 301 and the second serration 302 although the first shaft 110 and the second shaft 120 are brought in tight contact with each other by the bolt 130. However, as the ridges of the first serration 301 or the first coupling part 111 is tapered, the axial gap and circumferential gap between the first serration 301 and the second serration 302 may be compensated when the first shaft 110 and the second shaft 120 are brought in tight contact with each other by the bolt 130.

By the so-shaped vehicle steering device, it is possible to prevent vibration and gaps in a coupling structure between rotation shafts, thus allowing for reduction in noise, enhanced responsiveness, accurate steering, and a better straight driving performance.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering device of a vehicle, comprising:
   a first shaft having a first coupling part at an end thereof,
   a first serration formed on an outer circumferential surface of the first coupling part;

a second shaft having a second coupling part at an end thereof, the second coupling part having a coupling hole to which the first coupling part is inserted, a second serration formed on an inner circumferential surface of the second coupling part, the second serration engaged with the first serration; and a bolt axially and directly coupled to the first and second shaft.

2. The steering device of claim 1, wherein the second shaft is hollow, and wherein the bolt is inserted into the second shaft and coupled to the first shaft.

3. The steering device of claim 1, wherein an inner circumferential surface of the second shaft reduces in diameter to form a step portion, and wherein a head of the bolt is axially supported by the step portion.

4. The steering device of claim 3, wherein a supporting member supported on a side opposite to the step portion by the head of the bolt is coupled to the inner circumferential surface of the second shaft.

5. The steering device of claim 1, wherein the first shaft is hollow, and wherein the bolt is inserted into the first shaft and coupled to the second shaft.

6. The steering device of claim 1, wherein an inner circumferential surface of the first shaft reduces in diameter to form a step portion, and wherein a head of the bolt is axially supported by the step portion.

7. The steering device of claim 6, wherein a supporting member supported on a side opposite to the step portion by the head of the bolt is coupled to the inner circumferential surface of the first shaft.

8. The steering device of claim 1, wherein ridges of the first serration reduce in width from the first shaft toward the second shaft.

9. The steering device of claim 1, wherein ridges of the first serration reduce in height from the first shaft toward the second shaft.

10. The steering device of claim 1, wherein the first coupling part reduces in diameter from the first shaft toward the second shaft.

11. The steering device of claim 1, wherein the bolt is coupled to the first and second shafts in a direction of an axis of the first and/or second shaft.

12. The steering device of claim 1, wherein the bolt contacts both the first and second shafts parallelly with an axis of the first and/or second shaft.

* * * * *